(12) United States Patent
Pan et al.

(10) Patent No.: US 9,684,548 B2
(45) Date of Patent: Jun. 20, 2017

(54) INTEGRATING OPERATING SYSTEMS

(71) Applicant: Alibaba Group Holding Limited, Grand Cayman (KY)

(72) Inventors: Aiming Pan, Hangzhou (CN); Xu Zheng, Shanghai (CN); Xinzheng Li, Hangzhou (CN); Wei Li, Hangzhou (CN); Yanming Cai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/851,688

(22) Filed: Sep. 11, 2015

(65) Prior Publication Data

US 2016/0077898 A1 Mar. 17, 2016

(30) Foreign Application Priority Data

Sep. 12, 2014 (CN) .......................... 2014 1 0466753

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)
  *G06F 9/50* (2006.01)
(52) U.S. Cl.
  CPC ............ *G06F 9/541* (2013.01); *G06F 9/5005* (2013.01)

(58) Field of Classification Search
None
See application file for complete search history.

(56) References Cited

U.S. PATENT DOCUMENTS

| | | |
|---|---|---|
| 6,823,458 B1 | 11/2004 | Lee et al. |
| 8,341,643 B2 | 12/2012 | Fulton et al. |
| 9,164,787 B2 | 10/2015 | Xu |
| 2003/0043173 A1 | 3/2003 | Wasserman et al. |
| 2005/0125740 A1 | 6/2005 | Clow et al. |
| 2006/0070069 A1 | 3/2006 | Aguilar, Jr. et al. |
| 2011/0016301 A1 | 1/2011 | Galicia et al. |
| 2012/0042159 A1 | 2/2012 | Liu |
| 2015/0058611 A1 | 2/2015 | Reeves et al. |

OTHER PUBLICATIONS

PCT Search Report and Written Opinion mailed on Dec. 11, 2015 for PCT Application No. PCT/US15/49680, 9 pages.

*Primary Examiner* — Craig Dorais
(74) *Attorney, Agent, or Firm* — Lee & Hayes, PLLC

(57) ABSTRACT

A method and apparatus for integration of operating systems solve the problem in the conventional techniques with low efficiency in switching among the operating systems. The techniques of the present disclosure firstly starts a first operating system and its agent process, and then starts a second operating system, wherein the second operating system may call the agent process to request the first operating system for resources required by the second operating system. The second operating system may directly request the first operating system for the needed resources, which realizes the coexistence of the first operating system and the second operating system without mutual switching between the operating systems.

18 Claims, 5 Drawing Sheets

INTEGRATING OPERATING SYSTEMS

CROSS REFERENCE TO RELATED APPLICATIONS

This application claims foreign priority to Chinese Patent Application No. 201410466753.1 filed on Sep. 12, 2014, entitled "Method and Apparatus for Integrating Operating Systems", which is hereby incorporated by reference in its entirety.

TECHNICAL FIELD

The present disclosure relates to the technical field of computer technology, and, more particularly, to a method and apparatus for integration of operating systems.

BACKGROUND

With the development of computer technologies, operating systems suitable for various devices and applications (APPs) are rapidly emerging.

In actual application scenarios, since APPs under different operating systems usually have different features, with respect to a user who uses a same device, the user often needs to use the APPs under different operating systems. Thus, how to integrate different operating systems in the same device becomes a problem which urgently needs to be solved.

In the conventional techniques, different operating systems are usually integrated in a same device in the following two modes:

A first method is to install a plurality of operating systems in the same device directly. In this mode, the user may select and run a desirable operating system when the device is started, and after the selected operating system runs, the user may use the APPs under such operating system.

Apparently, when integrating a plurality of operating systems in the first mode, the user needs to select a desirable operating system upon the starting of the device. When the user wants to switch to another operating system, the user has to manually restart the device to switch to another operating system, which results in inconvenient operation and low efficiency in switching between the systems.

A second mode is to install a plurality of operating systems in a virtual machine. In this mode, the user may switch from an operating system at runtime to another operating system without restating the device.

However, when integrating a plurality of operating systems in the second mode, the user still needs to switch the operating system manually, which still results in low efficiency in switching between the systems. In addition, for general personal computers (PCs), the threshold of configurations of the PCs which support a virtual machine is high. Furthermore, the APPs in the plurality of operating systems also need to be supported by hardware, which means low virtualization efficiency. Therefore, the applicability of the second method is low.

As shown, in the conventional techniques, with respect to a device in which a plurality of operating systems are integrated, there is low efficiency in switching among those operating systems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method and apparatus for integration of operating systems to solve the problem in the conventional techniques with low efficiency in switching among operating systems.

The present disclosure provides an example method for integration of operating systems, which may include the following operations:

starting, by a terminal, a first operating system and an agent process of the first operating system;

starting, by the terminal, a second operating system;

calling the agent process through the second operating system;

requesting the first operating system for resources required by the second operating system through the agent process; and providing, by the terminal, the requested resources to the second operating system for use.

The present disclosure provides an example method for integration of operating systems, wherein a first operating system and a second operating system are installed in the same terminal, and the method may include the following operations:

calling, by the second operating system, an agent process of the first operating system, wherein the agent process is started by the first operating system;

requesting, by the second operating system, the first operating system for resources through the agent process; and performing a subsequent processing with the requested resources.

The present disclosure also provides an apparatus for integration of operating systems, which may include:

a first starting module that starts a first operating system and an agent process of the first operating system;

a second starting module that starts a second operating system;

a calling module that calls the agent process through the second operating system;

a resource requesting module that requests the first operating system for resources required by the second operating system through the agent process; and a providing module that provides the requested resources to the second operating system for use.

The present disclosure also provides another example apparatus for integration of operating systems, which may include:

a first starting module that starts a first operating system and an agent process of the first operating system;

a second starting module that starts a second operating system;

a calling module that calls the agent process through the second operating system;

a resource requesting module that requests the first operating system for resources required by the second operating system through the agent process; and a providing module that provides the requested resources to the second operating system for use.

The example embodiments of the present disclosure provide a method and apparatus for integration of operating systems. The techniques of the present disclosure firstly start a first operating system and its agent process, and then start a second operating system, wherein the second operating system may call the agent process to request the first operating system for resources required by the second operating system. Through the techniques of the present disclosure, the second operating system may directly request the first operating system for the needed resources, which thus realizes the coexistence of the first operating system and the second operating system without mutual switching between the operating systems.

BRIEF DESCRIPTION OF THE DRAWINGS

The drawings described herein provide further understanding of the present disclosure, and constitute a part of the present disclosure. The example embodiments of the present disclosure and the descriptions thereof are used to illustrate the present disclosure and are not intended to form limitations to the present disclosure.

DESCRIPTION

To make the objectives, technical solutions, and advantages of the present disclosure comprehensible, the technical solutions of the present disclosure are described in the following with reference to the example embodiments and corresponding accompanying drawings of the present disclosure. Apparently, the example embodiments to be described merely represent a part of and not all of the embodiments of the present disclosure. All other embodiments acquired by persons of ordinary skill in the art based on the example embodiments of the present disclosure without creative efforts shall belong to the protection scope of the present disclosure.

Figure 1:
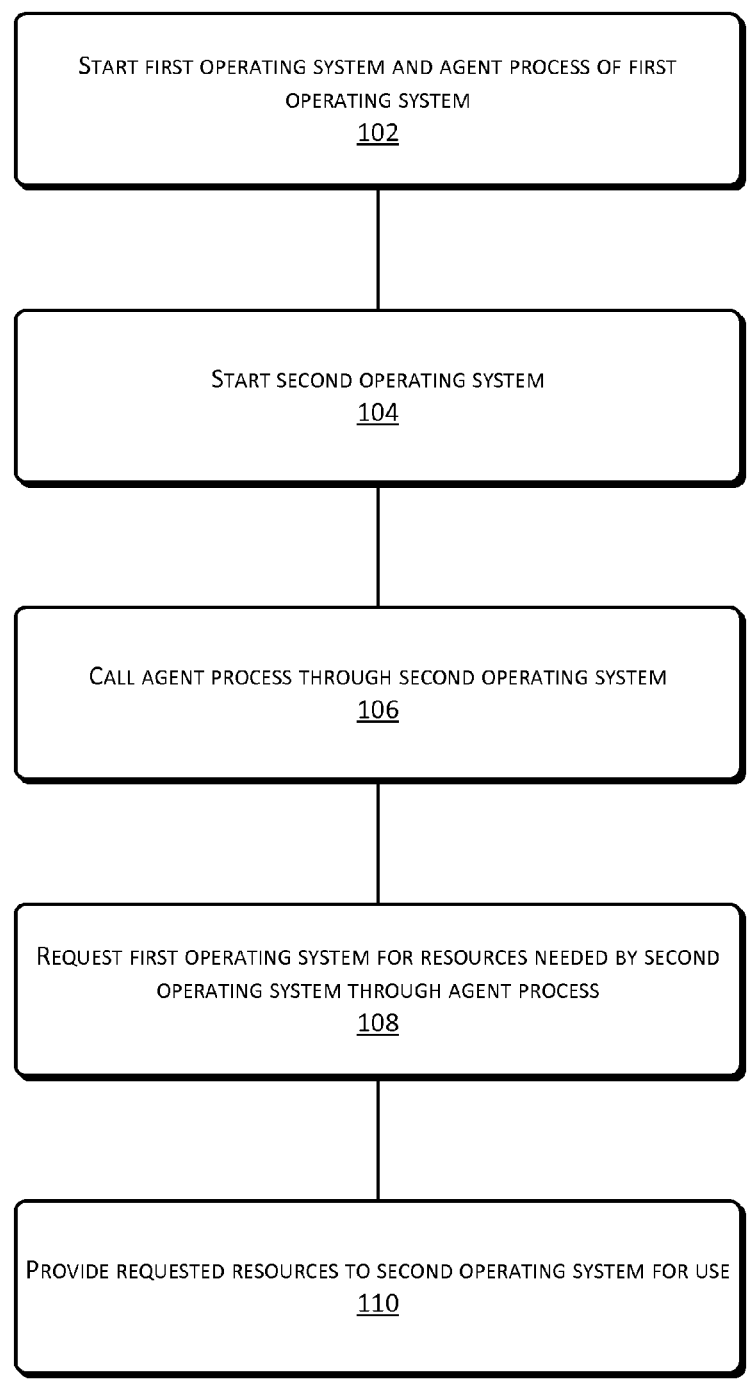
FIG. 1 is an example integration process of operating systems according to an example embodiment of the present disclosure.

FIG. 1 illustrates a flow chart of an example integration process of operating systems according to an example embodiment of the present disclosure, which may include the following operations:

At 102, a terminal starts a first operating system and an agent process of the first operating system.

In the example embodiment of the present disclosure, the agent process is a process of the first operating system. The agent process is called by other processes to request the first operating system for resources.

For example, supposing that the first operating system is an Android™ system, the terminal may firstly start the Android™ system and an agent process of the Android™ system.

At 104, the terminal starts a second operating system.

In the example embodiment of the present disclosure, the first operating system and the second operating system are installed in the same terminal. The second operating system may be started either after the starting of the first operating system, or simultaneously with the first operating system.

Continuing with the above example, supposing that the second operating system is an example operation such as X (X system), the terminal may start the X system after the Android™ system and the agent process of the Android™ system are started.

At 106, the agent process is called through the second operating system.

At 108, the first operating system is requested for resources required by the second operating system through the agent process.

After the terminal starts the second operating system, the second operating system may call the agent process of the first operating system to request the first operating system for resources required by the second operating system through the agent process, wherein the resources in the example embodiment of the present disclosure may include, but are not limited to, a graphic input buffer, a user operation event, an input method interface, etc.

Continuing with the above example, after the X system is started, the agent process of the Android™ system may be called. Through the agent process, the X system may request the Android™ system for resources required by the X system or APPs under the X system, wherein the APPs may include, but are not limited to, locally installed APPs and web APPs.

At 110, the terminal provides the requested resources to the second operating system for use.

After the second operating system requests the first operating system for the required resources through the agent process, a subsequent processing may be performed with the requested resources, i.e., the second operating system may use the resources to run its own service processes or APPs.

As shown, in the above method, with respect to the first operating system, since the agent process is a process of the first operating system, or the first operating system regards the agent process as a trusted process, when the second operating system requests the first operating system for resources through the agent process, the first operating system actually does not know or does not need to know who requests the resources. In other words, the first operating system actually does not know or does not need to know the existence of the second operating system, and only regards the second operating system as a common APP which requests the resources through the agent process, and the second operating system is invisible to the first operating system. Furthermore, with respect to the second operating system, as long as it requests the needed resources through the agent process, the second operating system may run its own service processes or APPs to provide a service to the users. Therefore, the above method may realize the coexistence of the first operating system and the second operating system, and there is no need for the users to switch between the first operating system and the second operating system, which effectively facilitates the user operation. Thus, with respect to APPs which have similar functions and may only run either the first operating system or the second operating system, the users do not need to install respective APPs on both operating systems and only need to install the APPs, such as a directory APP, on one operating system.

In the example embodiment of the present disclosure, when the above first operating system is the Android™ system, the agent process may be an Activity preset according to a standard framework of the Android™ system, which may be called as a Proxy Activity. The Proxy Activity is similar to a common Activity in the Android™ system, both of which may be called by any process (such as an APP or the second operating system), and the calling method is the same as the method for the APP under the Android™ system to call the common Activity.

For example, the Proxy Activity differs from the common Activity in the Android™ system merely in the following: when the terminal starts the common Activity in the Android™ system, the terminal calls back a corresponding APP through the common Activity, and displays an interface (including controls in the APP) of the APP in a window corresponding to the common Activity, and the common Activity will make a response to the user operation events monitored by the Android™ system according to a rule preset in the APP. However, when the terminal starts the Proxy Activity, the terminal does not call back any APP or other processes through the Proxy Activity and will hide the window corresponding to the Proxy Activity (the standard framework of the Android™ system has already regulated that a window corresponding an Activity may be hidden and a method for hiding a window corresponding an Activity, which will not be repeated in the present disclosure), and the Proxy Activity only transmits the resources required by the second operating system between the Android™ system and the second operating system.

Further, in order to realize the integration of the operating systems, the problem how to use a same hardware device (including various hardware devices in a terminal) to serve a plurality of operating system needs to be solved, wherein one of the most important things is how to display graphic interfaces (or windows) of different operating systems. Therefore, in the example embodiment of the present disclosure, the terminal may request the first operating system for a graphic input buffer required by the second operating system through the agent process of the first operating system, and set an order such as a Z order for the requested graphic input buffer. When the second operating system uses the requested resources, the terminal may provide the requested graphic input buffer to the second operating system, such that the second operating system or an APP under the second operating system may write display data into a display device of the terminal through the graphic input buffer for the display device of the terminal to draw a to-be-displayed image according to the written-in display data and the Z order of the graphic input buffer.

The graphic input buffer is part of the buffer area of the display device (such as a display card) in the terminal. The Z order is a sequential order in which the terminal displays the images corresponding to the display data in each graphic input buffer. The higher the Z order of a graphic input buffer is, the closer to the top layer the position of the image corresponding to the display data in such graphic input buffer and displayed by the terminal is. On the contrary, the lower the Z order is, the closer to the bottom layer the position of the corresponding image displayed by the terminal is.

For example, the following description is illustrative of when the display device of the terminal being a display card.

Generally, in order to enable the display card in the terminal to display an image, the display data of the image needs to be written into the buffer area of the display card of the terminal, and the allocation of the buffer area of the display card is decided by the first operating system. Supposing that an APP under the first operating system needs to display an image, the APP may request the first operating system for a graphic input buffer. The first operating system uses a part of the buffer of the display card as the graphic input buffer and allocates to the APP. The APP writes the display data of the to-be-displayed image into the buffer area of the display card through the graphic input buffer. The display card reads the display data in the buffer area thereof, and draws and displays a corresponding image. When the first operating system allocates the graphic input buffer for the APP, the first operating system sets a Z order for the graphic input buffer. The Z order decides the position for subsequently displayed images (i.e., a coverage relation). Generally, the Z order of a wallpaper is closer to the bottom layer. In other words, images of other APPs will cover the wallpaper.

In terms of the integration of the first operating system and the second operating system, in the example method according to the embodiment of the present disclosure, the second operating system may request the first operating system for a graphic input buffer through the agent process of the first operating system, and the first operating system allocates the graphic input buffer for the second operating system and sets a Z order for the allocated graphic input buffer. After the second operating system requests and receives the graphic input buffer, the second operating system may write display data into the buffer area of the display card through the graphic input buffer, such that the display card draws an image and displays the corresponding image according to the Z order. As shown, for the first operating system, the second operating system is just a common program which requests for the graphic input buffer and the Z order by using the agent process.

In addition, in the example embodiment of the present disclosure, with respect to the second operating system or the APP under the second operating system, how to run service or what kind of service is provided is generally dependent on the user operation. Therefore, the second operating system also needs to know the operation executed by the users. Thus, the terminal may request the first operating system for the monitored user operation events through the agent process of the first operating system and then provide the requested user operation event to the second operating system, such that the second operating system or the APP under the second operating system executes corresponding operations according to the user operation event.

For example, in short, with respect to user click operations, the second operating system needs to know where the users' clicks are, and those user operation events are monitored and transmitted by the hardware of the terminal to the first operating system. Therefore, the second operating system may still request the first operating system for those user operation events through the agent process of the first operating system, and then perform corresponding operations according to those requested user operation events.

Considering that the second operating or the APP under the second operating system may need to call an input method interface in an actual application scenario such that the users may input symbols such as Chinese characters, letters and numbers through the input method interface, the terminal may request the first operating system for calling the input method interface through the agent process and display the input method interface. In other words, the second operating system may request the first operating system for calling the input method interface through the agent process. It is to be noted that the called input method interface is an input method interface of the first operating system and not an input method interface of the second operating system.

For example, since the input method interface is for the users to input characters, the input method interface should be displayed above the image displayed by the second operating system or the APP under the second operating system, such that when the terminal requests the first operating system for the graphic input buffer required by the second operating system through the agent process, the Z order set for the graphic input buffer is ranked after the Z order of the input method interface. In other words, the input method interface called by the second operating system is displayed above the image displayed by the second operating system or the APP thereunder. Specifically, the Z order of the input method interface of the first operating system may be preset to be placed foremost.

A system structure is described below in case of integration of the first operating system being an Android™ system and the second operating system being an X system.

Figure 2:
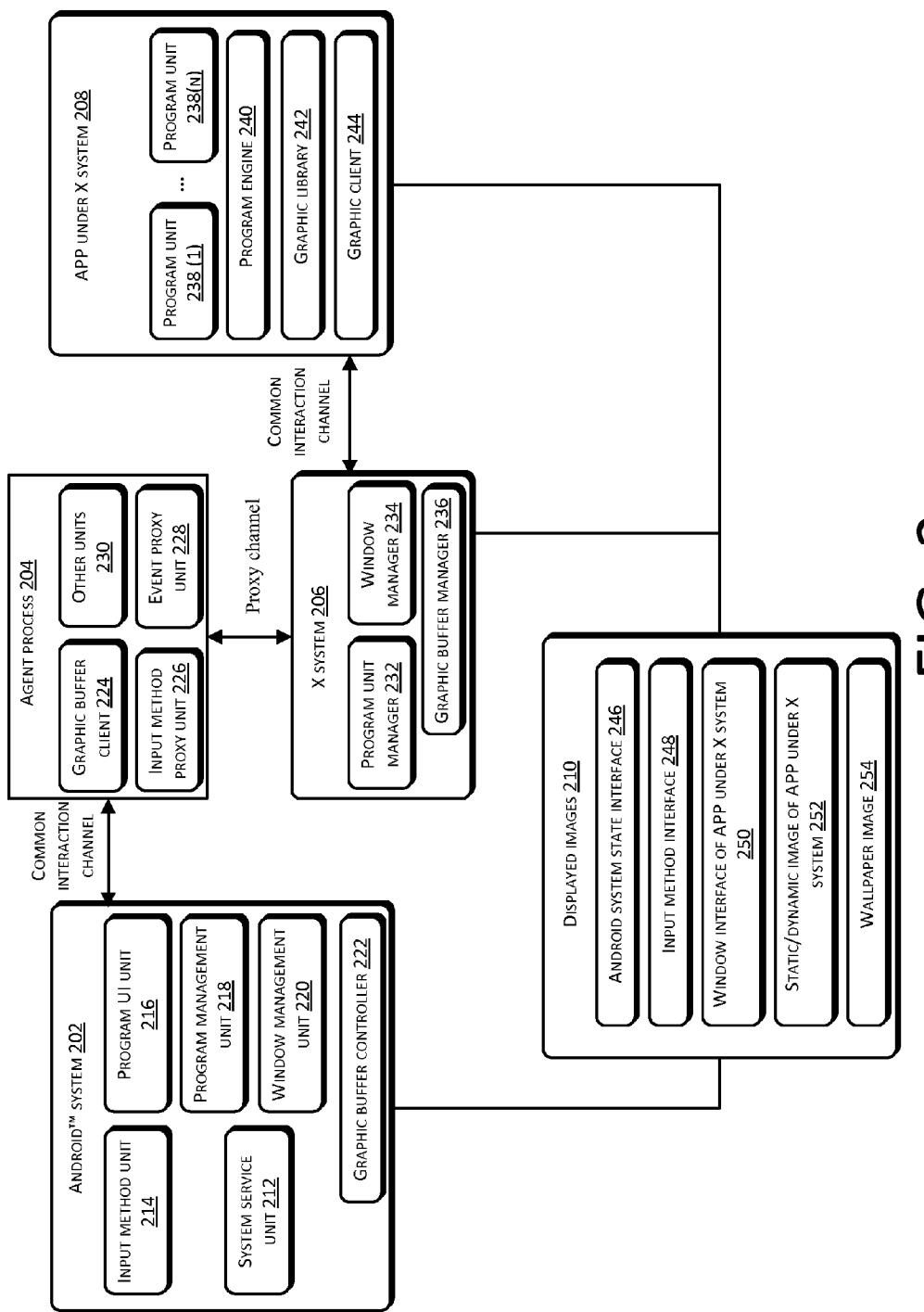
FIG. 2 is a schematic diagram of an example system structure in case of integration of an Android™ system and an example operating system X (X system) according to an embodiment of the present disclosure.

FIG. 2 is a schematic diagram of an example system structure in case of integration of an Android™ system and an X system according to the embodiment of the present disclosure. In the system structure as shown in FIG. 2, the system structure includes an Android™ system 202, an agent process 204, an X system 206, an APP under the X system 208, and displayed images 210.

The Android™ system 202 includes a system service unit 212, an input method unit 214, a program UI (User Interface) unit 216, a program management unit 218, a window management unit 220, and a graphic buffer controller 222.

The system service unit 212 provides a system service of the Android™ system 202 to users. The input method unit 214 manages an input method interface of the Android™ system 202 and relevant functions. The system UI unit 216 manages an UI of the Android™ system 202. The program management unit 218 manages program processes of the Android™ system 202 and an example APP under the Android™ system 208. The window management unit 220 manages buffer areas of a display card of a terminal and sets Z orders. The graphic buffer controller 222 manages display data written by each program through a graphic input buffer.

The agent process 204 includes a graphic buffer client 224, an input method proxy unit 226, an event proxy unit 228, and other units 230.

The graphic buffer client 224 requests the Android™ system 202 for the graphic input buffer. The input method proxy unit 226 requests the Android™ system 202 for the input method interface. The event proxy unit 228 requests the Android™ system 202 for monitored user operation events. The one or more other units 230 execute other functions.

The X system 206 includes a program unit manager 232, a window manager 234, and a graphic buffer manager 236.

The program unit manager 232 manages program units of each APP under the X system 206. The window manager 234 requests the Android™ system 202 for the graphic input buffer through the agent process 204. The graphic buffer manager 236 manages display data written by each APP under the X system 206 through the graphic input buffer.

The APP under the X system 208 includes one or more program units 238(1), . . . , 238(n) (n may be any integer), a program engine 240, a graphic library 242, and a graphic client 244.

The program units 238 (1), . . . , 238(n) provide corresponding functions. The program engine 240 calls an execute statement to run each program unit. The graphic library 242 stores display data of a to-be-displayed image. The graphic client 244 writes the display data into the display card of the terminal through the graphic input buffer.

The displayed images 210 include an Android™ system state interface 246, an input method interface 248, a window interface of the APP under the X system 250, a static/dynamic image of the APP under the X system 252, and a wallpaper image 254.

In the system structure as shown in FIG. 2, the Android™ system 2-2 interacts with the agent process 204 through a common interaction channel, the agent process 204 interacts with the X system 206 through a dedicated proxy channel, and the X system 206 interacts with the APP under the X system 208 through a common interaction channel. For example, since the agent process 204 described in the present disclosure is an Activity under the standard framework of the Android™ system 202, the common interaction channel between the Android™ system 202 and the agent process 204 refers to a channel used when a common Activity in the Android™ system 202 interacts with a kernel (i.e., a Linux kernel) of the Android™ system 2-4. Since the X system 206 is invisible to the Android™ system 202 and is just equivalent to a common APP, the proxy channel between the X system 206 and the agent process 204 is equivalent to a channel for interaction between the APP under the Android™ system 202 and a common Activity. The common interaction channel between the X system 206 and the APP under the X system 208 refers to a channel for interaction between a kernel of the X system 206 and the APP under the X system 208.

Figure 3:
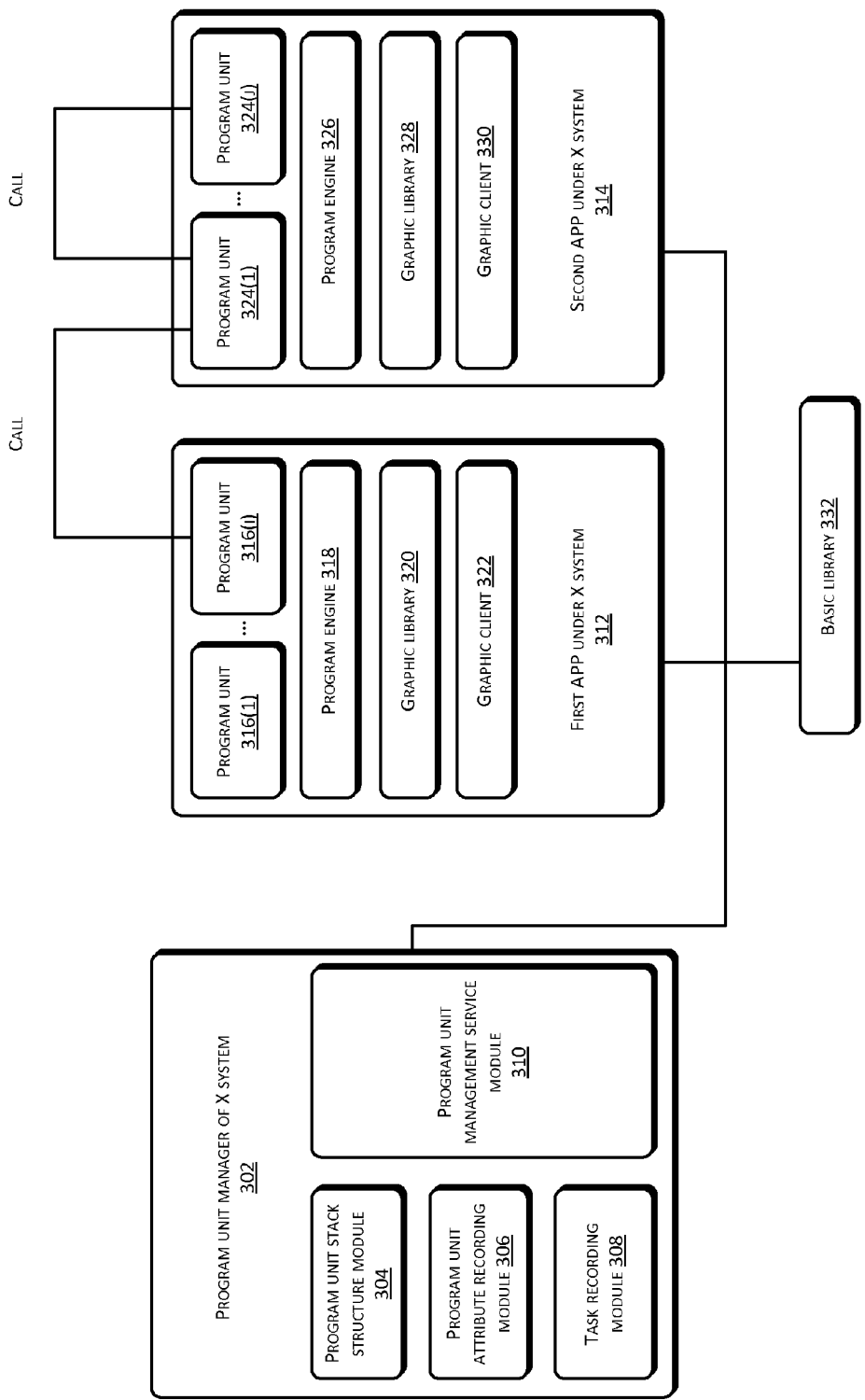
FIG. 3 is a schematic diagram of an example interaction between the X system and an APP under the X system according to an embodiment of the present disclosure.

FIG. 3 is a schematic diagram of an example interaction between an X system and an APP under the X system according to the example embodiment of the present disclosure. In FIG. 3, a program unit manager in the X system 302 includes a program unit stack structure module 304, a program unit attribute recording module 306, a task recording module 308, and a program unit management service module 310.

The program unit stack structure module 304 temporarily stores a to-be-executed program unit in a corresponding APP under the X system such as a first APP under X system 312 or a second APP under X system 314. The first APP under the X system 312 includes one or more program units 316 (1), . . . , 316(i) (i may be any integer), a program engine 316, a graphic library 318, and a graphic client 322. The second APP under the X system 314 includes one or more program units 324 (1), . . . , 324(j) (j may be any integer), a program engine 326, a graphic library 328, and a graphic client 330.

The program unit attribute recording module 306 records an attribute of the to-be-executed program unit. The task recording module 308 records executed tasks. The program unit management service module 310 manages executed program units.

In FIG. 3, the program unit in an APP under the X system not only may call a program unit in this APP, but also may call program units in other APPs (i.e., cross-APP calling). For example, the program unit 324(1) may call the program unit 324j) in the second APP under the X system 314. The program unit 316(i) in the first APP under the X system 312 may call the program unit 324(1) in the second APP under the X system 314.

A program engine in a respective APP may execute the program unit in this APP by calling a basic execute statement in a basic library 332 and the X system.

The method for integration of operating systems according to the example embodiment of the present disclosure is described above. Based on the same or similar concept, the present disclosure further provides example apparatuses for integration of operating systems, as shown in FIG. 4 and FIG. 5.

Figure 4:
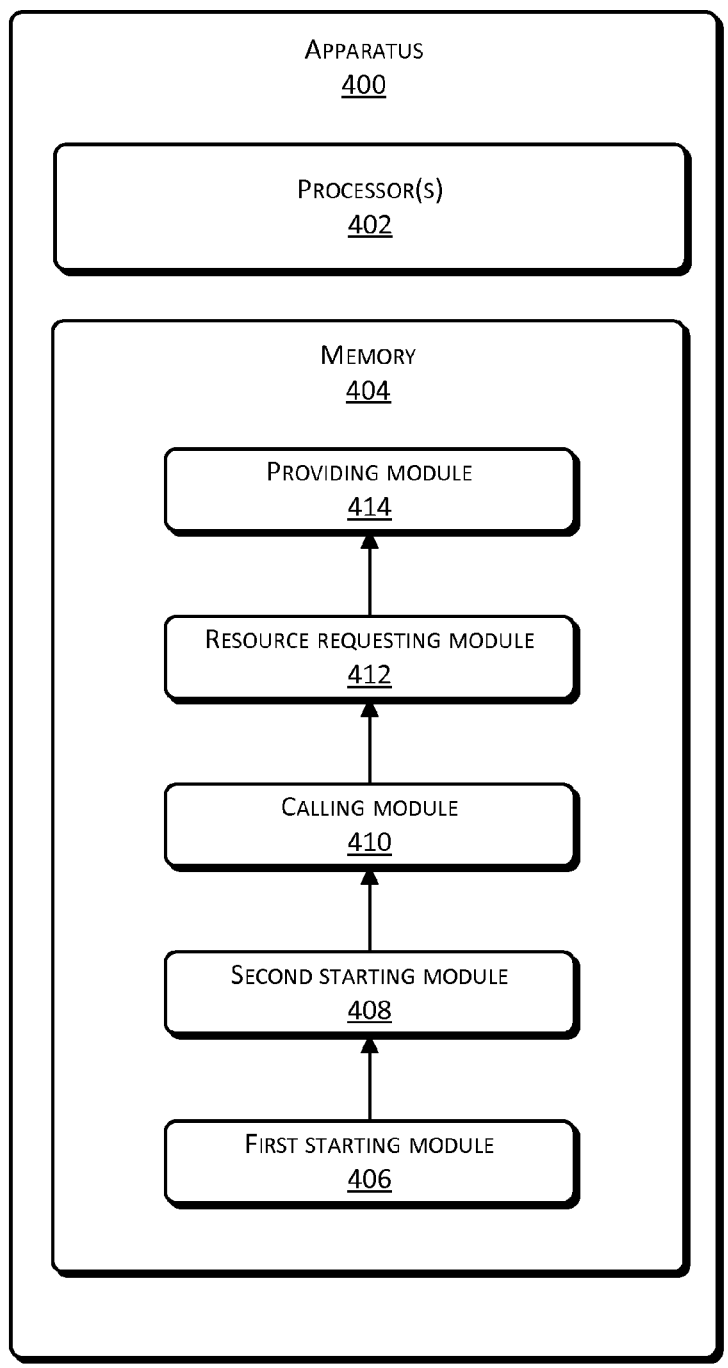
FIG. 4 is a structural schematic diagram of an example apparatus for integration of operating systems according to an example embodiment of the present disclosure.
Figure 5:
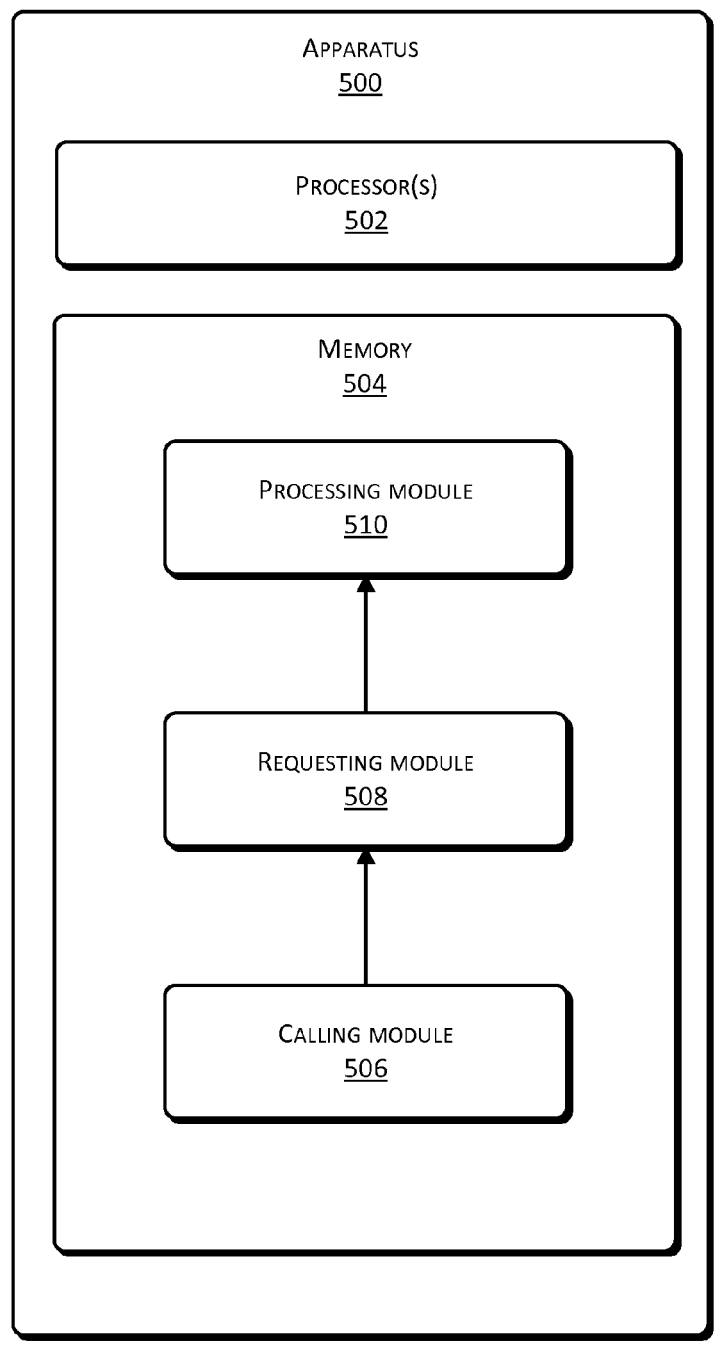
FIG. 5 is a structural schematic diagram of another example apparatus for integration of operating systems according to an example embodiment of the present disclosure.

FIG. 4 is a structural schematic diagram of an example apparatus 400 for integration of operating systems according to an example embodiment of the present disclosure.

The apparatus 400 includes one or more processor(s) 402 or data processing unit(s) and memory 404. The apparatus 400 may further include one or more input/output apparatuses and network interfaces (not shown in FIG. 4). The memory 404 is an example of computer-readable media.

The memory 404 may store therein a plurality of modules or units including:

a first starting module 406 that starts a first operating system and an agent process of the first operating system;

a second starting module 408 that starts a second operating system;

a calling module 410 that calls the agent process through the second operating system;

a resource requesting module 412 that requests the first operating system for resources required by the second operating system through the agent process; and a providing module 414 that provides the requested resources to the second operating system for use.

For example, the resource requesting module 412 requests the first operating system for a graphic input buffer required by the second operating system through the agent process, and sets a Z order for the graphic input buffer. The providing module 414 provides the requested graphic input buffer to the second operating system, such that the second operating system or an APP under the second operating system writes display data into a display device of the apparatus through the graphic input buffer for the display device of the apparatus to draw a to-be-displayed image according to the written-in display data and the Z order.

For example, the resource requesting module 412 requests the first operating system for monitored user operation events through the agent process. The providing module 414 provides the requested user operation events to the second operating system, such that the second operating system or an APP under the second operating system executes corresponding operations according to the user operation events.

For example, the resource requesting module 412 requesting the first operating system for calling an input method interface through the agent process. The providing module 414 displays the input method interface.

For example, the resource requesting module 412, when requesting the first operating system for the graphic input buffer required by the second operating system through the agent process, ranks the Z order set for the graphic input buffer after the Z order of the input method interface.

For example, the apparatus as shown in FIG. 4 may be located in a terminal.

FIG. 5 is a structural schematic diagram of another example apparatus 500 for integration of operating systems according to another example embodiment of the present disclosure.

The apparatus 500 includes one or more processor(s) 502 or data processing unit(s) and memory 504. The apparatus 500 may further include one or more input/output apparatuses and network interfaces (not shown in FIG. 5). The memory 504 is an example of computer-readable media.

The memory 504 may store therein a plurality of modules or units including:

a calling module 506 that calls an agent process of a first operating system, wherein the agent process is started by the first operating system;

a requesting module 508 that requests the first operating system for resources through the agent process; and a processing module 510 that performs a subsequent processing with the requested resources.

For example, the requesting module 508 requests the first operating system for a graphic input buffer through the agent process. The processing module 510 writes display data into a display device through the graphic input buffer for the display device to draw a to-be-displayed image according to the written-in display data and a Z order set by the first operating system for the graphic input buffer.

For example, the requesting module 508 requests the first operating system for user operation events through the agent process, wherein the user operation events are monitored by the first operating system.

For example, the requesting module 508 requests the first operating system for calling an input method interface through the agent process.

The present disclosure provides a method and apparatus for integration of operating systems. The techniques of the present disclosure firstly start a first operating system and its agent process, and then start a second operating system, wherein the second operating system may call the agent process to request the first operating system for resources required by the second operating system. Through the techniques of the present disclosure, the second operating system may directly request the first operating system for the needed resources, which thus realizes the coexistence of the first operating system and the second operating system without mutual switching between the operating systems.

In a standard configuration, a computing device, such as the terminal or the apparatus, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. An apparatus comprising:
    one or more processors; and
    memory having stored thereon a plurality of modules executable by the one or more processors, the plurality of modules comprising:
        a first starting module that starts a first operating system and an agent process of the first operating system;
        a second starting module that starts a second operating system;
        a calling module that calls the agent process through the second operating system;
        a resource requesting module that requests the first operating system for a resource required by the second operating system through the agent process; and
        a providing module that provides the resource to the second operating system to enable the second operating system to use the resource without switching between the first operating system and the second operating system, wherein the resource comprises a function of the first operating system.

2. The apparatus of claim 1, wherein:
    the resource requesting module further requests the first operating system for a graphic input buffer required by the second operating system through the agent process, and sets a display order for the graphic input buffer; and
    the providing module further provides the requested graphic input buffer to the second operating system, such that the second operating system or an APP under the second operating system writes display data into a display device of the apparatus through the graphic input buffer for the display device of the apparatus to draw a to-be-displayed image according to the display data and the display order.

3. The apparatus of claim 2, wherein the display order comprises a Z order that is a sequential order in which the apparatus displays images corresponding to display data in the graphic input buffer.

4. The apparatus of claim 1, wherein:
    the resource requesting module further requests the first operating system for a monitored user operation event through the agent process; and
    the providing module further provides the requested user operation event to the second operating system, such that the second operating system or an APP under the second operating system executes a corresponding operation according to the user operation event.

5. The apparatus of claim 1, wherein:
    the resource requesting module further requests the first operating system for calling an input method interface through the agent process; and
    the providing module further displays the input method interface.

6. The apparatus of claim 5, wherein the resource requesting module further, when requesting the first operating system for a graphic input buffer required by the second operating system through the agent process, ranks a first display order for the graphic input buffer after a second display order of the input method interface.

7. A method implemented by a computing device comprising a plurality of modules, the method comprising:
    starting, by a first starting module, a first operating system and an agent process associated with the first operating system;
    starting, by a second starting module, a second operating system;
    calling, by a calling module, the agent process through the second operating system;
    requesting, by a resource requesting module, the first operating system for a resource required by the second operating system through the agent process; and
    providing, by a providing module, the resource to the second operating system to enable the second operating system to use the resource without switching between the first operating system and the second operating system, wherein the resource comprises a function of the first operating system.

8. The method of claim 7, further comprising:
    requesting the first operating system for a graphic input buffer required by the second operating system through the agent process, and setting a display order for the graphic input buffer; and
    providing the requested graphic input buffer to the second operating system, such that the second operating system or an APP under the second operating system writes display data into a display device of the computing device through the graphic input buffer for the display device to draw a to-be-displayed image according to the display data and the display order.

9. The method of claim 8, wherein the display order comprises a Z order that is a sequential order in which the computing device displays images corresponding to display data in the graphic input buffer.

10. The method of claim 7, further comprising:
    requesting the first operating system for a monitored user operation event through the agent process; and
    providing the requested user operation event to the second operating system, such that the second operating system or an APP under the second operating system executes a corresponding operation according to the user operation event.

11. The method of claim 7, further comprising:
    requesting the first operating system for calling an input method interface through the agent process; and
    displaying the input method interface.

12. The method of claim 11, further comprising: when requesting the first operating system for a graphic input buffer required by the second operating system through the agent process, ranking a first display order for the graphic input buffer after a second display order of the input method interface.

13. One or more computer-readable media storing a plurality of modules executable by one or more processors, the plurality of modules comprising:
- a first starting module that, when executed by the one or more processors, starts a first operating system and an agent process of the first operating system;
- a second starting module that, when executed by the one or more processors, starts a second operating system;
- a calling module that, when executed by the one or more processors, calls the agent process through the second operating system;
- a resource requesting module that, when executed by the one or more processors, requests the first operating system for a resource required by the second operating system through the agent process; and
- a providing module that, when executed by the one or more processors, provides the resource to the second operating system to enable the second operating system to use the resource without switching between the first operating system and the second operating system, wherein the resource comprises a function of the first operating system.

14. The one or more computer-readable media of claim 13, wherein:
- the resource requesting module, when executed by the one or more processors, further requests the first operating system for a graphic input buffer required by the second operating system through the agent process, and sets a display order for the graphic input buffer; and
- the providing module, when executed by the one or more processors, further provides the requested graphic input buffer to the second operating system, such that the second operating system or an APP under the second operating system writes display data into a display device of the apparatus through the graphic input buffer for the display device of the apparatus to draw a to-be-displayed image according to the display data and the display order.

15. The one or more computer-readable media of claim 14, wherein the display order comprises a Z order that is a sequential order in which the computing device displays images corresponding to display data in the graphic input buffer.

16. The one or more computer-readable media of claim 13, wherein:
- the resource requesting module, when executed by the one or more processors, further requests the first operating system for a monitored user operation event through the agent process; and
- the providing module, when executed by the one or more processors, further provides the requested user operation event to the second operating system, such that the second operating system or an APP under the second operating system executes a corresponding operation according to the user operation event.

17. The one or more computer-readable media of claim 13, wherein:
- the resource requesting module, when executed by the one or more processors, further requests the first operating system for calling an input method interface through the agent process; and
- the providing module, when executed by the one or more processors, further displays the input method interface.

18. The one or more computer-readable media of claim 17, wherein the resource requesting module, when executed by the one or more processors, further ranks a first display order for a graphic input buffer required by the second operating system through the agent process after a second display order of the input method interface, when requesting the first operating system for the graphic input buffer.

* * * * *